(12) United States Patent  
    Nakahira (10) Patent No.: US 8,189,078 B2  
(45) Date of Patent: May 29, 2012

(54) IMAGING APPARATUS

(75) Inventor: Toshiaki Nakahira, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 274 days.

(21) Appl. No.: 12/667,704

(22) PCT Filed: Jul. 23, 2008

(86) PCT No.: PCT/JP2008/063614  
§ 371 (c)(1),  
(2), (4) Date: Jan. 5, 2010

(87) PCT Pub. No.: WO2009/014249  
PCT Pub. Date: Jan. 29, 2009

(65) Prior Publication Data  
US 2010/0208108 A1      Aug. 19, 2010

(30) Foreign Application Priority Data  
Jul. 25, 2007   (JP) .................................. 2007-193192

(51) Int. Cl.  
    H04N 9/64     (2006.01)  
    H04N 5/222    (2006.01)  
    H04N 5/228    (2006.01)  
    G06K 9/40     (2006.01)  
    G06K 9/00     (2006.01)

(52) U.S. Cl. ................ 348/248; 348/333.01; 348/222.1; 348/249; 348/208.16; 348/333.12; 82/274; 82/254; 82/375; 82/103

(58) Field of Classification Search .............. 348/222.1, 348/221.1, 223.1, 272, 241–251, 208.16, 348/333.01–333.13, 730; 382/103, 254, 382/274, 275  
See application file for complete search history.

(56) References Cited

U.S. PATENT DOCUMENTS  
5,631,458 A      5/1997   Nakahira et al.  
(Continued)

FOREIGN PATENT DOCUMENTS  
JP         2001-268453 A      9/2001  
(Continued)

*Primary Examiner* — Lin Ye  
*Assistant Examiner* — Marly Camargo  
(74) *Attorney, Agent, or Firm* — Dickstein Shapiro LLP (57) ABSTRACT

An imaging apparatus includes an image pickup device that images a photogenic subject, a drive part that drives the image pickup device in order to read out image signals from the image pickup device, a digital signal processing part in which image signals outputted from the image pickup device are inputted and processed, one image display part connected to the digital signal processing part and configured to display using one display format a processed image, another image display part connected to the digital signal processing part and configured to display using another display format the processed image and which requires more time for display processing than the time required for display processing by the one display format and an image switch-over part for switching over an image display device between the one image display part and the another image display part. The digital signal processing part includes an operation speed shift part for setting the speed of operation of the drive part in correspondence to the switch-over of an image display device from the one image display part to the another image display part and a smear detection part for detecting smears based on image data obtained from the image pickup device. When smears are not detected based on the detection result of the smear detection part, the digital signal processing part maintains the speed of operation when an image is displayed in the another image display part to the speed of operation when an image is displayed in the one image display part.

15 Claims, 7 Drawing Sheets

U.S. PATENT DOCUMENTS

| | | |
|---|---|---|
| 5,854,949 A | 12/1998 | Furukawa et al. |
| 6,970,198 B1 * | 11/2005 | Schinner et al. ......... 348/333.01 |
| 7,180,543 B2 | 2/2007 | Ojima et al. |
| 7,187,409 B2 | 3/2007 | Nakahira et al. |
| 7,545,420 B2 * | 6/2009 | Kondo ........................ 348/248 |
| 7,880,783 B2 * | 2/2011 | Irie .............................. 348/248 |
| 8,111,308 B2 * | 2/2012 | Suwa ........................... 348/248 |
| 2001/0008416 A1 | 7/2001 | Misawa et al. |
| 2003/0103063 A1 | 6/2003 | Mojaver et al. |
| 2003/0169346 A1 | 9/2003 | Ojima et al. |
| 2004/0141082 A1 | 7/2004 | Nakahira |
| 2004/0239780 A1 | 12/2004 | Nakahira |
| 2005/0052553 A1 | 3/2005 | Kido et al. |
| 2006/0197856 A1 | 9/2006 | Nakahira |
| 2007/0030369 A1 | 2/2007 | Ojima et al. |
| 2007/0165120 A1 | 7/2007 | Takane |

FOREIGN PATENT DOCUMENTS

| | | | |
|---|---|---|---|
| JP | 2003-78807 A | | 3/2003 |
| JP | 2004-15595 A | | 1/2004 |
| JP | 2005-86499 A | | 3/2005 |
| JP | 2005-354170 A | | 12/2005 |
| JP | 2006-157237 A | | 6/2006 |
| JP | 2006-157535 A | | 6/2006 |
| JP | 2006157237 A | * | 6/2006 |
| JP | 3983126 B2 | | 7/2007 |

* cited by examiner

IMAGING APPARATUS

CROSS-REFERENCE TO RELATED APPLICATION

This application is based on and claims priority from Japanese Patent Application No. 2007-193192, filed on Jul. 25, 2007, the disclosure of which is incorporated herein by reference in its entirety.

TECHNICAL FIELD

The present invention relates to an improvement in an imaging apparatus such as a digital camera.

BACKGROUND ART

In most imaging apparatuses, for example, digital still cameras, an optical finder is included. In recent years, in technological fields of digital still cameras, the development of optical finders has progressed towards the direction of small sized, longer focal point devices. Optical finders of the digital still cameras include optical finders of a TTL format in which a photogenic subject image based on light passing through an imaging lens system is viewed and optical finders of a format other than the TTL format.

Optical finders other than the TTL format are difficult to realize a structure that fits into a small sized body and corresponds to a long focal point. Therefore, digital still cameras not including an optical finder and digital still cameras including an electrical viewfinder (referred to as EVF hereinbelow) are increasing.

Digital still cameras of this kind include an image pickup device that takes an image of a photogenic subject, an image pickup device drive part that drives the image pickup device in order to read out image data from the image pickup device and a digital signal processing part in which image data outputted from the image pickup device is inputted and processed.

In addition, it is known that digital still cameras include one image display part connected to the digital signal processing part and configured to display using one display format of processed image data, another image display part connected to the digital signal processing part and configured to display using another display format of the processed image data and requiring more processing time than that required for display processing by the one display format, an image switch-over part for switching over an image display device between the one image display part and the other image display part and a clock signal supply part that sets the speed of operation of the image pickup device drive part.

For example, it is known that an imaging apparatus, for example, a digital still camera includes an image display part, for example, an electrical viewfinder (referred to as EVF hereinbelow) and a liquid crystal display device (referred to as LCD hereinbelow) (For example, refer to JP2004-15595A).

In this digital still camera, when a user performs photographing manipulation whilst visually confirming a real-time image of a photogenic subject, a frame rate at the time an image is displayed on the EVF or the LCD in live view is set to be a standard frame rate.

In addition, when a user does not perform photographing manipulation whilst visually confirming a real-time image of a photogenic subject, the frame rate at the time an image is displayed on the EVF or the LCD in live view is set to be a frame rate lower than the standard frame rate.

Furthermore, in this digital still camera, the frame rate is lowered based on detection results by a battery detection circuit and the frame rate is lowered corresponding to the exposure time of an image pickup device, for example, a CCD.

By these processings, this digital still camera has a decreased amount of electricity consumption per unit time and the burden on a processing circuit built-in the digital still camera with regard to image processing is eased.

As a result, the battery can be effectively utilized and as many images as possible can be recorded and stored.

In addition, for example, a digital camera is known having a constitution of recognizing by a CPU (central processing unit) an output impedance characteristic value of a power source and a large consumption electrical current operation mode, when the output impedance characteristic value of the power source exceeds a standard value and during the large consumption electrical current operation mode time span, a drive frequency of a CCD is set to be lower than the ordinary frequency, and when the output impedance characteristic value of the power source is below the standard value, a drive frequency of a CCD at the time obtaining an AF evaluated value is set to be higher than the ordinary frequency (for example, refer to JP3983126B).

In this digital still camera, when the output impedance characteristic value of the power source exceeds a standard value and during the large consumption electrical current operation mode time span, because a drive frequency of a CCD is set to be lower than the ordinary frequency, a high quality image can be stably obtained. In addition, when the output impedance characteristic value of the power source is below the standard value, because a drive frequency of a CCD is set to be higher than the ordinary frequency at the time an AF evaluated value is obtained, obtaining of the AF evaluated value is performed at high speed so that the total imaging time can be shortened.

Incidentally, in the case an EVF is compared with a conventional LCD, the problems described hereinbelow are present.

Figure 1:
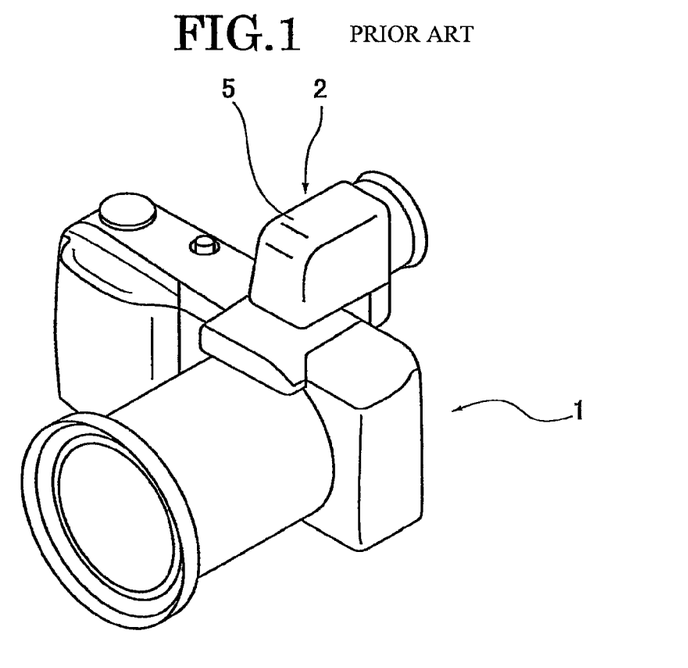
FIG. 1 is a diagram that illustrates an external view of a conventional digital still camera.
Figure 2:
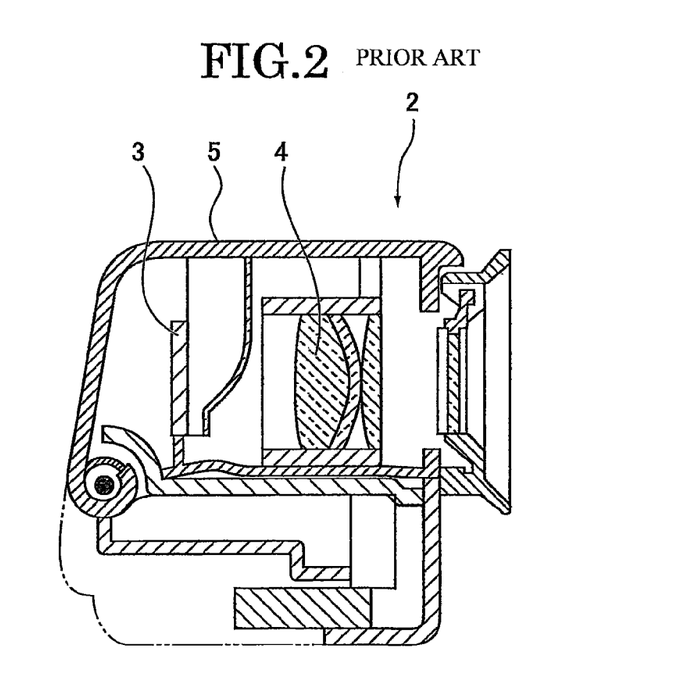
FIG. 2 is a cross-sectional diagram that illustrates an approximate structure of an electrical viewfinder device shown in FIG. 1.

FIG. 1 illustrates an external view of a digital camera 1 including an image display part, for example, an EVF 2. The EVF 2, as illustrated in FIG. 2, is approximately constituted by a display device, for example, a small sized LCD 3, a magnifying lens optical system 4 and a cover member 5 of a tube shape that covers these and shields light.

Comparing this EVF 2 when used for monitoring with an image display part, for example, an LCD conventionally used for confirmation of framing and viewing photographed images in a digital still camera, the LCD 3 of the EVF 2 has a display screen size smaller than a conventional LCD display screen size so that it is easy to view across the whole screen.

In addition, because the LCD 3 and the magnifying lens optical system 4 of the EVF 2 are covered by the cover member 5, outdoor visibility is improved in comparison to a conventional LCD.

Although the EVF 2 has the above-described merits, structurally, it has an inclination to be compared to an optical finder that generates no output delay. That is, because the EVF 2 has a small display screen size, a user has to stare at a small screen area and this is problematic as the movement of a photogenic subject on the screen causes misalignment against the actual movement of the photogenic subject (speed of follow-up).

In addition, in the case where outdoor photographing is performed using a digital still camera, smearing, which is not problematic when monitoring is performed using a conventional LCD, is likely to become a problem in the case of the EVF 2.

The smearing thereof is said to be generated as if dragging on a thin trail across a broad area of the whole screen in the case where a high brightness photogenic subject exists within a photographing frame.

In the case of performing outdoor photographing using a digital still camera and in the case of using a conventional LCD to perform monitoring, in the conventional LCD, because visual confirmation is originally performed under an unfavorable condition in which visibility is not good, such smearing was virtually not a problem.

In comparison, in the EVF 2, the LCD 3 is visually confirmed in a state shielding light whereby in comparison to a conventional LCD, visual confirmation is performed under a better condition in which visibility is good so that the smearing becomes eye-catching.

In addition, when a user performs monitoring using the EVF 2, the user feels a sense of discomfort from the smearing generated due to the bright spot of a spotlight and an indoor fluorescent lamp, which is not generated in an optical finder In this way, a digital still camera including the EVF 2 differs from a conventional LCD in that the EVF 2 is used as a substitute for an optical finder, and has unique problems.

In addition, depending on the types of output device for image data, there are digital still cameras in which it is necessary to convert the display format from general video formats (for example, video formats of a CCIR-601 format, a CCIR-656 format and a 8 bit RGB serial format) to a video format for displaying on the actual display device, for example, an LCD.

A display device of the EVF 2, for example, an LCD 3 comprised from ferroelectric liquid crystal is used. Image data outputted from an output device in a general video format must be converted into RGB surface sequence data using an encoder circuit within the LCD 3.

In the case this LCD 3 comprised from ferroelectric liquid crystal is used, in comparison to an LCD of a display format that does not require the conversion of video format, a delay of about one sixtieth of a second is generated from the photographing time point to the display time point in which a photogenic subject image is displayed on the screen of LCD 3.

Hereby a constitution for converting the video format of image data using an encoder circuit within the LCD 3 is adopted, but a delay is also generated in the case where video format is converted in an image processing part of a digital still camera.

Furthermore, a conventional LCD and the LCD 3 used in the EVF 2 differ in their power consumption. In general, power consumption of display devices differs. For example, in the case of an LCD using an LED as a light source, in order to allow the brightness per unit area to be constant, it is clear that the larger the image display area, the larger the power consumption.

Because the power consumed at the display device takes up about one fourth of the total power consumption of an imaging apparatus, if the power consumed at the display device changes, the change influences the total power consumption of the imaging apparatus in no small measure.

When the power consumption of a digital still camera changes due to the switch-over of image display parts to which image data is outputted, a setup value of a battery check voltage set based on a discharge curve property of a battery under one condition must be changed according to display devices used as output devices.

That is, even when the residual quantity of battery is the same, if the power consumed by an image display part becomes less, then the lessened portion becomes the extra portion of power that can be distributed to photographing and as a result, a greater number of pieces of a photographed image can be obtained. On the contrary, even when the residual quantity of battery is the same, if the power consumed by an image display part increases, then the increased portion becomes the portion of power that cannot be distributed to photographing and as a result, the number of pieces of images that can be photographed is decreased.

In this way, the setup value of a battery check voltage used to indicate based on the residual quantity of battery how many remaining pieces of images can be photographed is changed according to the types of display devices used as output devices of image data so that a user is notified about the appropriate number of pieces that can be photographed.

However, in this way, set up values are changed for each difference in power consumption properties of image display parts of output devices, a memory of the disposed number of image display parts with differing power consumption properties is prepared and it is necessary to record and store the setup value in this memory, which leads to growth of memory capacity and consequently, the cost of the digital still camera is increased.

Therefore, in an imaging device able to switch-over between an image display part in which together with delay, smearing is crucial and becomes a problem but power consumption is less and an image display part in which together with delay, smearing is not crucial and does not become a problem but power consumption is large, the property of the imaging apparatus as a whole changes according to a display device used for monitoring.

DISCLOSURE OF THE INVENTION

An object of the present invention is to provide an imaging apparatus capable of preventing increment in power consumption, thereby enabling obtaining as many photographed images as possible.

To accomplish the above object, an imaging apparatus according to one aspect of the present invention includes an image pickup device that images a photogenic subject, a drive part that drives the image pickup device in order to read out image signals from the image pickup device, a digital signal processing part in which image signals outputted from an image pickup device are inputted and processed, one image display part connected to the digital signal processing part and configured to display using one display format a processed image, another image display part connected to the digital signal processing part and configured to display using another display format the processed image and in which more time is required for display processing than the time required for display processing by the one display format, and an image switch-over part for switching over an image display device between the one image display part and the another image display part. The digital signal processing part includes an operation speed shift part for fastening the speed of operation of the drive part in correspondence to the switch-over of an image display device from the one image display part to the other image display part, a smear detection part for detecting smears based on image data obtained from the image pickup device, and when smears are not detected based on the detection result of the smear detection part, the digital signal processing part maintains the speed of operation at the time an image is displayed in the other image display part to the speed of operation at the time an image is displayed in the one image display part.

According to another aspect of the present invention, an imaging apparatus of the present invention includes an image pickup device that images a photogenic subject, a drive part that drives the image pickup device in order to read out image signals from the image pickup device, a digital signal processing part in which image signals outputted from the image pickup device are inputted and processed, one image display part connected to the digital signal processing part and configured to display using one display format a processed image, another image display part connected to the digital signal processing part and configured to display using another display format the processed image and in which more time is required for display processing than the time required for display processing by the one display format, an image switch-over part for switching over an image display device between the one image display part and the another image display part, and a photogenic subject movement detection part that detects a relative movement of the photogenic subject. The digital signal processing part includes an operation speed shift part for fastening the speed of operation of the drive part in correspondence to the switch-over of an image display device from the one image display part to the another image display part and when the photogenic subject movement detection part detects no movement of the photogenic subject, the digital signal processing part maintains the speed of operation at the time an image is displayed in the another image display part to the speed of operation at the time an image is displayed in the one image display part.

According to another aspect of the present invention, an imaging apparatus of the present invention includes an image pickup device that images a photogenic subject, a drive part that drives the image pickup device in order to read out image signals from the image pickup device, a digital signal processing part in which image signals outputted from the image pickup device are inputted and processed, one image display part connected to the digital signal processing part and configured to display using one display format a processed image, another image display part connected to the digital signal processing part and configured to display using another display format the processed image and in which more time is required for display processing than the time required for display processing by the one display format, and an image switch-over part for switching over an image display device between the one image display part and the another image display part. The digital signal processing part includes an operation speed shift part for fastening the speed of operation of the drive part in correspondence to the switch-over of an image display device from the one image display part to the another image display part and the digital signal processing part instructs the operation speed shift part to implement a process of increasing a clock signal frequency based on a first stage release manipulation of a photographing switch.

According to another aspect of the present invention, in an imaging apparatus of the present invention, the power consumption required for display processing by the another image display part is smaller than the power consumption required for display processing by the one image display part.

According to another aspect of the present invention, in an imaging apparatus of the present invention, the display area of the another image display part is smaller than the display area of the one image display part.

According to another aspect of the present invention, in an imaging apparatus of the present invention, the one image display part is a liquid crystal display device, the another image display part is an electrical viewfinder device, and the electrical viewfinder device includes a display device, a magnifying optical system that magnifies an image displayed in the display device and a cover member that covers the display device and the magnifying optical system and is configured to shield light.

According to another aspect of the present invention, in an imaging apparatus of the present invention, the digital signal processing part instructs the operation speed shift part to implement a process of fastening an operation speed based on a first stage release manipulation of a photographing switch.

According to another aspect of the present invention, in an imaging apparatus of the present invention, a horizontal drive frequency of the image pickup device at the time the image is displayed in the another image display part is approximately two times the horizontal drive frequency at the time the image is displayed in the one image display part.

According to another aspect of the present invention, in an imaging apparatus of the present invention, an increased portion in power consumption consumed when an operation speed of the image pickup device is fastened in correspondence to the switch-over of display devices of an image from the one image display part to the another image display part is approximately the same as a decreased portion of power consumption decreased in correspondence to the switch-over of display devices of an image from the one image display part to the another image display part.

BEST MODE FOR CARRYING OUT THE INVENTION

Preferred embodiments of a digital still camera as an imaging apparatus according to the present invention are described in detail with reference to the drawings hereinbelow. However, the constituent parts, type, combination, shape and the relative positions described in the following embodiments are not thought to be limited to only the scope of the descriptions unless there is a specific notation, but are only descriptive examples.

Figure 3:
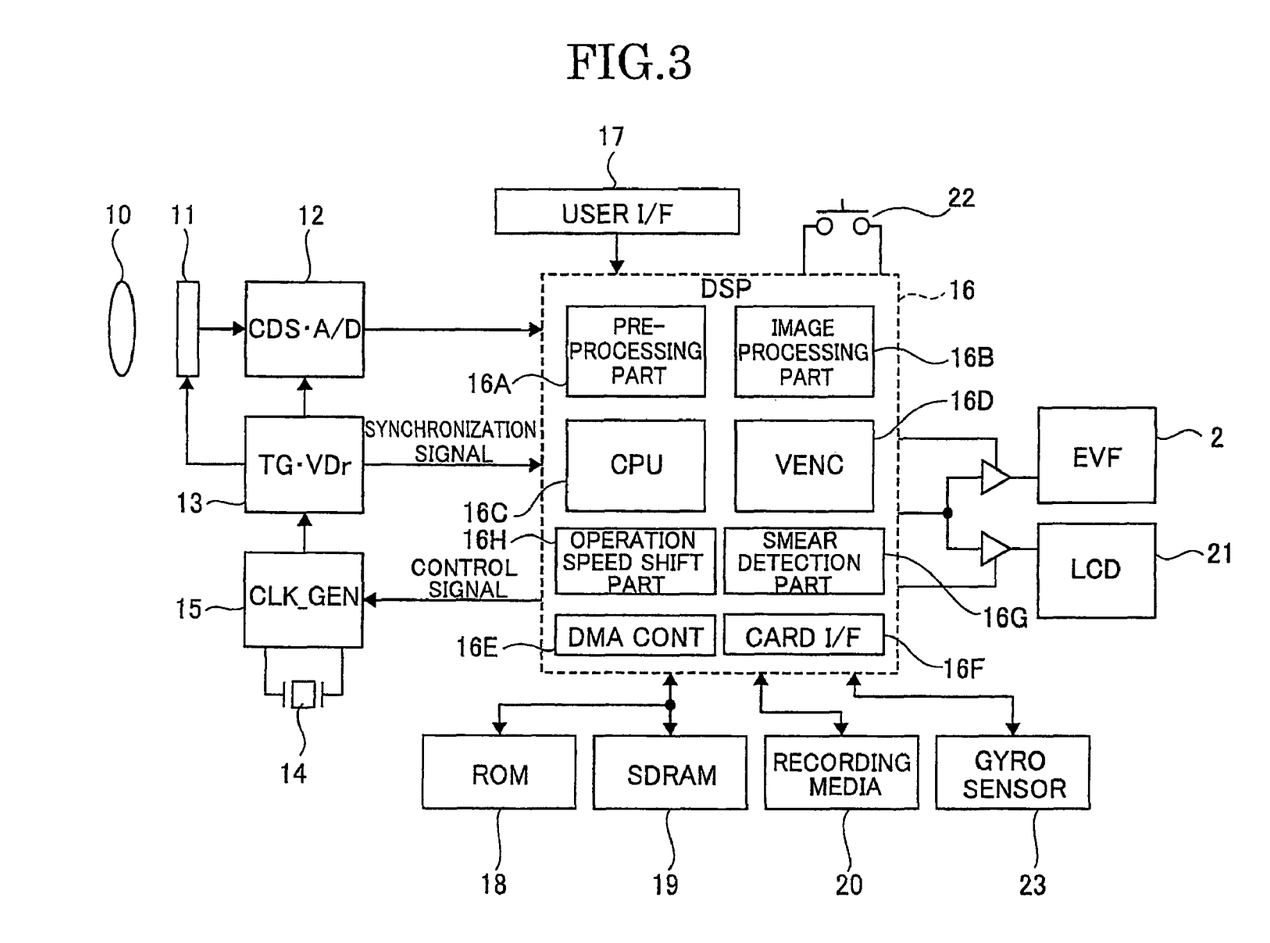
FIG. 3 is a schematic diagram that illustrates a block circuit of a digital still camera according to an embodiment of the present invention.

FIG. 3 is a block circuit diagram that illustrates schematically an imaging apparatus according to the present invention, which is, for example, applied to a digital still camera. In FIG. 3, the digital still camera includes an image pickup device 11, a drive part, a digital signal processor 16, one image display part, another image display part, an image switch-over part 22, a clock signal supply part 15, an operation speed shift part, a smear detection part and a photogenic subject movement detection part. Specifically, 10 is an imaging lens, the image pickup device is, for example, a CCD, 12 is correlated double sampling (CDS) and an analog digital converter circuit, 13 is a vertical driver that constitutes a portion of the drive part, 14 is a crystal oscillator, the clock signal supply part is, for example, a clock generator (CLK_GEN), the digital signal processing part is, for example, a digital signal processor, 17 is a user interface, 18 is a ROM, 19 is a SDRAM, 20 is a recording media, 21 is an LCD, the image switch-over part is, for example, a switch-over switch for switching over between an EVF 2 and the LCD 21 and 23 are gyro sensors for detecting camera shake.

The user interface 17 includes a photographing switch. By manipulating the photographing switch, photometry and distance measurements are performed by a first stage release manipulation and photographing is implemented by a second stage release manipulation.

An imaging system is constituted of a timing generator•vertical driver (TG•VDr) 13, a crystal oscillator 14, a clock generator 15, an imaging lens 10 and a CCD 11. The timing generator•vertical driver (TG•VDr) 13 is driven by a master clock signal from the clock generator 15. A display system is constituted of the EVF 2 and the LCD 21.

In the clock generator 15, a frequency of a master clock signal is variably controlled based on control signals from the digital signal processor 16. The digital signal processor 16 includes a pre-processing part 16A, an image processing part 16B, a central processing unit (CPU) 16C, a video encoder (VENC) part 16D, a direct memory access controller (DMA_CONT) part 16E, a card interface 16F, a smear detection part 16G and an operation speed shift part 16H.

A control program for operating the digital still camera is stored in the ROM 18. The control program is loaded to the CPU 16C when the power of the digital still camera is turned on. The SDRAM 19 is described later. The recording media 20 is mounted onto the card interface 16F and data is sent and received between the recording media 20 and the digital signal processor 16.

The sending and receiving of information between the ROM 18, the SDRAM 19 and the digital signal processor 16 are performed via the DMA_CONT part 16E. The operation speed shift part 16H outputs control signals to the clock generator 15. The vertical driver 13 outputs drive signals to the image pickup device 11, the correlated double sampling and the analog digital converter circuit 12, and also outputs synchronization signals to the digital signal processor 16.

The light of a photogenic subject entering through the imaging lens 10 forms an image in the image pickup device 11. For example, an image pickup device of a primary color Bayer array is used for the image pickup device 11. Electrical charges corresponding to the light quantity of light of the photogenic subject are accumulated in an acceptance surface of the image pickup device 11.

The image pickup device 11 outputs by means of drive signals screen image signals to the correlated double sampling and the analog digital converter circuit 12. The correlated double sampling and the analog digital converter circuit 12 perform analog digital conversion of the screen image signals and output to the digital signal processor 16 as image data. The digital signal processor 16 performs predetermined processing on the image data and outputs to the EVF 2 or the LCD 21.

Hereby, the LCD 21 is a one-image display part that displays using one-display-format post-image processing image data that is image-processed by the digital signal processor 16. The EVF 2 is another image display part in which post-image processing image data image-processed by the digital signal processor 16 is displayed using another display format.

Hereby, the EVF 2 is also the another image display part in which improvement against smears is desired and more time is required for display processing than the time required for display processing by the one display format. The LCD 3 of the EVF 2 has a display area smaller than the display area of the LCD 21. In addition, when image display is performed via the EVF 2, the power consumption is lower than the case where image display is performed via the LCD 21.

Figure 4:
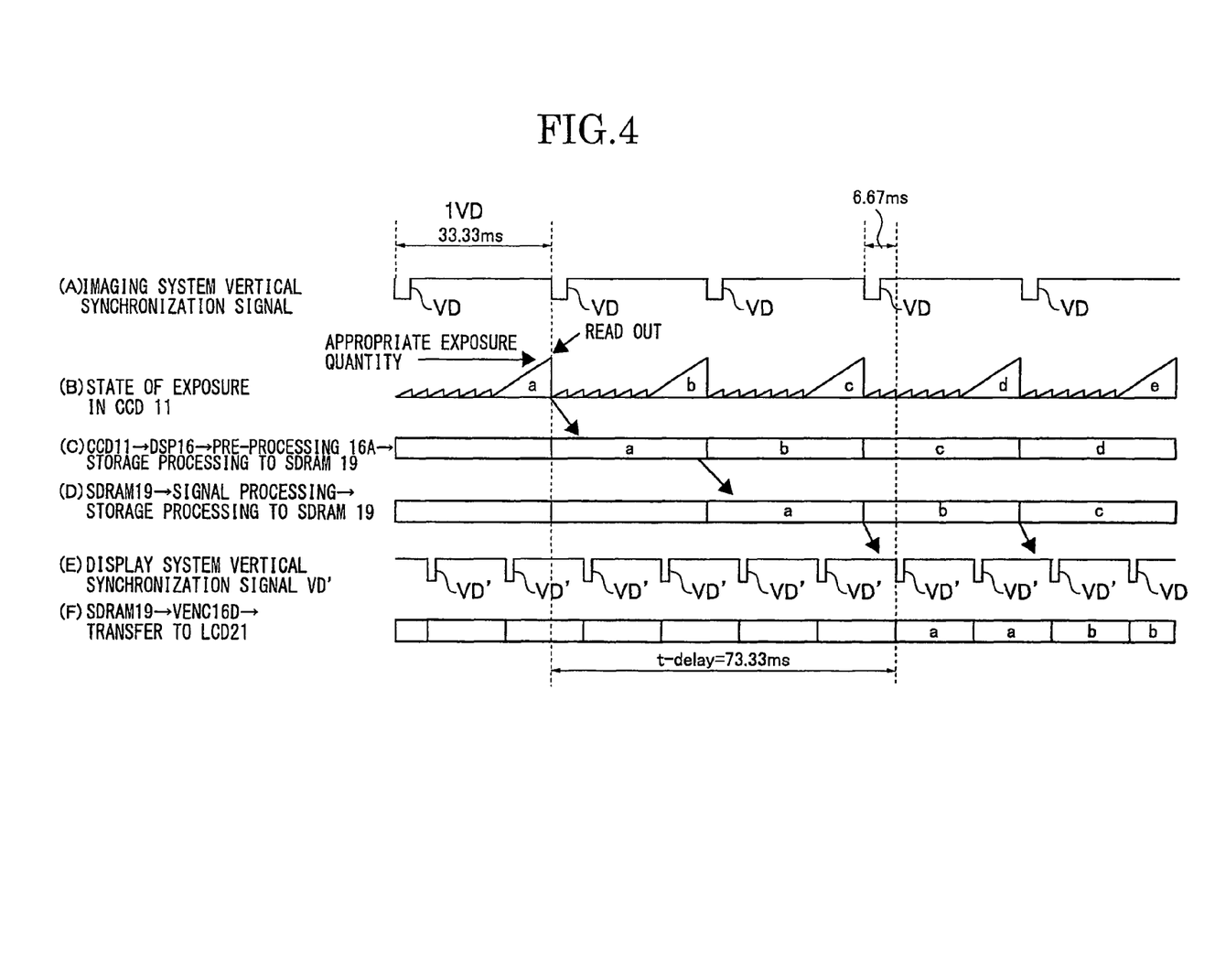
FIG. 4 is a timing chart describing a monitoring operation of an LCD of a digital still camera according to an embodiment of the present invention.

FIG. 4 illustrates an operation timing chart of a digital still camera when an image is displayed on the LCD 21 and monitoring of a photogenic subject is performed.

In FIG. 4A, VD illustrates vertical synchronization signals. Hereby, one vertical synchronization period (1 VD) is set to about 33.33 milliseconds (msecs). The one vertical synchronization period corresponds to a maximum exposure time of one screen portion. The one vertical synchronization period (1 VD) is set to the time required to transfer electrical charge signals corresponding to image data of the one screen portion accumulated in the image pickup device 11 by exposure.

The time required to transfer one pixel, for example, in the case of a CCD of a video graphics array (VGA) type, is about 108 (=(33.33×10$^6$)/(640×480)) nanoseconds (nsecs), because effective pixels are (640×480) pixels. Because the frequency is a reciprocal number of the time required to transfer one pixel, the horizontal drive frequency is about 9.2 MHz. In general, the fastest horizontal drive frequency of a CCD used in a digital still camera is about 36 MHz.

The reason for this is that if the horizontal drive frequency is further increased, power consumption of the imaging system will increase drastically and usage in a digital still camera driven by a battery is not preferable.

In addition, in the case of a CCD of a VGA type, because the horizontal drive frequency is generally about 9.2 MHz, if driven by a horizontal drive frequency three times as large, then the horizontal drive frequency becomes 27.6 MHz, which does not generate the problem of the drastic increase of the power consumption of the imaging system.

As shown in FIG. 4B, when monitoring for a predetermined period by means of an electro-shutter pulse, electrical charge signals accumulated in each pixel part 11A (refer to FIG. 5) of the CCD 11 are swept out, and the accumulation of electrical charge signals in each pixel part of the CCD 11 begins when the electro-shutter pulse is turned off.

Figure 5:
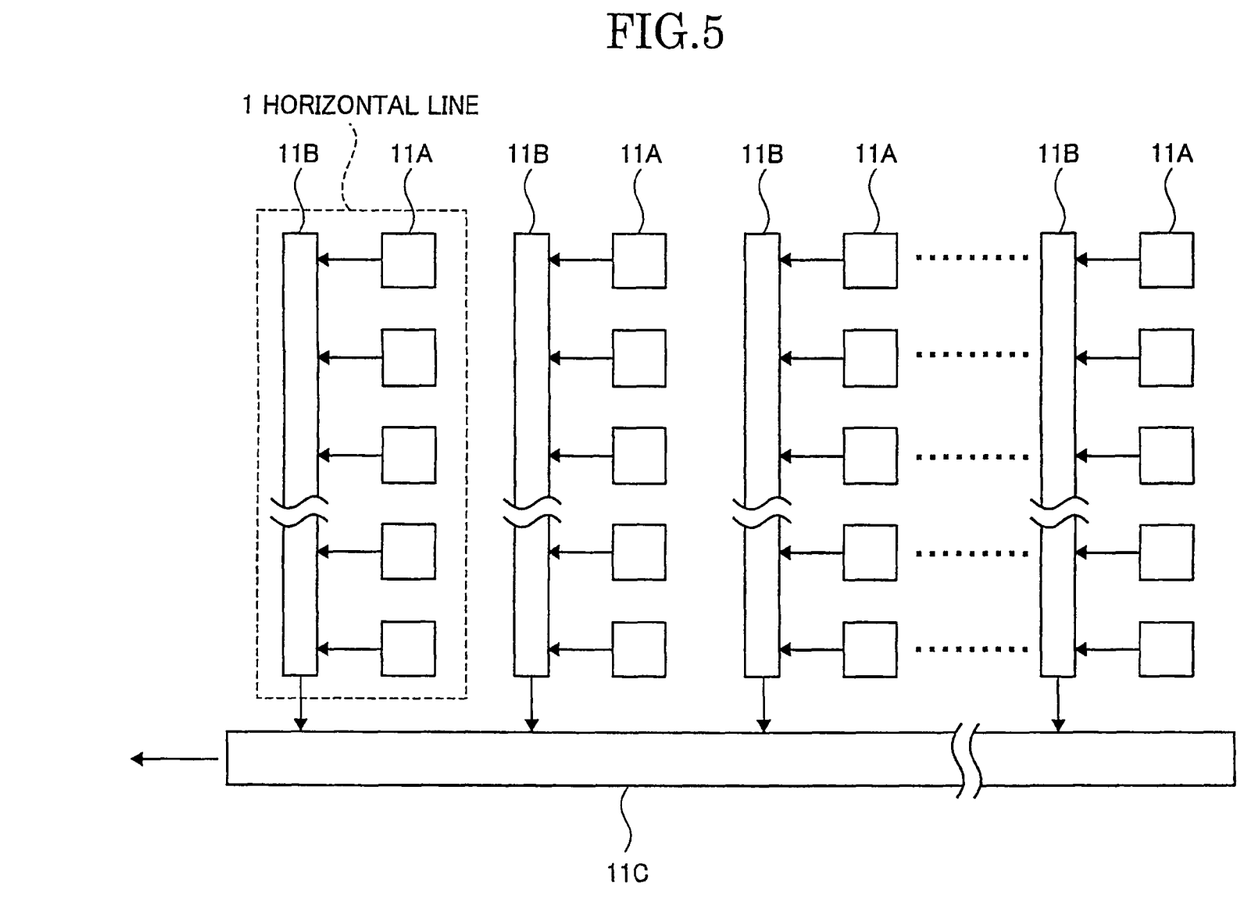
FIG. 5 is a frame format diagram illustrating a transfer state of electrical charge signals read out from an image pickup device.

Incidentally, when electrical charge signals corresponding to an appropriate exposure quantity are accumulated in each pixel part 11A, the electrical charge signals accumulated in each pixel part 11A are transferred to a vertical transfer part 11B as shown in FIG. 5 in a trailing edge timing of the vertical synchronization signal VD. Electrical charge signals transferred to the vertical transfer part 11B are vertically transferred to a horizontal transfer part 11C from line to line. After the completion of the horizontal transfer of one line portion, electrical charge signals of the next line are transferred to the vertical transfer part 11B, after which the electrical charge signals transferred to the vertical transfer part 11B are horizontally transferred. By such a repetition, image signals of one screen portion are transferred.

The image data of one screen portion is inputted to the digital signal processor 16 and stored in the SDRAM 19. In more detail, screen image signals outputted from the CCD 11 are subjected to sampling in one pixel units in a CDS circuit (Correlated Double Sampling circuit) of the correlated double sampling and the analog digital converter circuit 12 and inputted to the A/D conversion circuit at the next stage.

Screen image signals outputted from the CCD 11 are subjected to analog•digital conversion by the A/D conversion circuit and are inputted to the digital signal processor 16 as digital image data (RGB image data). In the pre-processing part 16A of the signal processor 16, a pedestal processing for aligning the black level and a processing to obtain a RGB integration value for white balance adjustment are performed.

In a digital still camera having an auto focus function, in addition to these processings, a processing to obtain focus data in order to acquire differential data for auto focus is performed in a circuit part (abbreviated for illustration) of the digital signal processor 16.

Image data inputted to the digital signal processor 16, after these processings are performed, are stored once in the SDRAM 19 still as RGB image data via the direct memory access controller (DMA_CONT) part 16E.

These processings are processed virtually in real time, and as illustrated in FIG. 4C, are performed within the period of the next vertical synchronization signal VD. FIG. 4C illustrates in a frame format the state until the screen image signals outputted from the CCD 11 are stored in the SDRAM 19 as image data. In addition, in FIG. 4B, signs a, b, c, d, e denote image data of an appropriate exposure quantity obtained when monitoring.

Image data (RGB image data) once stored in the SDRAM 19, as illustrated in FIG. 4D within the next one vertical synchronization VD, is transferred to the image processing part 16B via the direct memory access controller (DMA_CONT) part 16E. The image processing part 16B carries out white balance processing, y conversion processing, color interpolation processing, color conversion processing and resize processing on the image data. Hereby, color conversion processing is the conversion from RGB image data to YCrCb image data. Resize processing is the conversion of image data size to image size adapting to the size used in output devices. The YCrCb image data is again stored in the SDRAM 19.

In the case of a general conventional LCD 21 that adopts a digital interface format of 8 bit RGB image data, the YCrCb image data stored in the SDRAM 19 is transferred to the video encoder (VENC) part 16D. Then, the YCrCb image data is subjected to color conversion processing by the video encoder (VENC) part 16D. That is, YCrCb image data is converted to RGB image data. The video encoder (VENC) part 16D includes a double buffer memory (abbreviated for illustration) so that no hindrance is generated for image display even when the imaging system and the display system are asynchronous.

Image data stored temporarily in the double buffer memory is transferred to the LCD 21 as illustrated in FIG. 4F based on the generation of the vertical synchronization signals of the display system as illustrated in FIG. 4E. Herewith, an image based on image data a is displayed on a display surface of the LCD 21. Hereby, the cycle of the vertical synchronization signal VD' of the display system is 60 frames per second (fps) as illustrated in FIG. 4E, and the cycle of the vertical synchronization signal VD of the imaging system is set to half that amount at 30 frames per second (fps). The cycle of the virtual synchronization signal VD of the imaging system is the same as the cycle of CCIR-601 and CCIR-656 generally used as a video interface. The cycle of the vertical synchronization signal VD' of the display system is about 16.67 msecs. Hereby, in view of each cycle two times the vertical synchronization signal VD of the imaging system, the misalignment time of the vertical synchronization signal VD' of the display system against the vertical synchronization signal VD of the imaging system is set to 6.67 msecs.

Under this condition, as illustrated in FIG. 4A, paying attention to image a, the delay time from the read out of image data from the CCD 11 to the image data being displayed in the display surface of the LCD 21 is 73.33 msecs (33.33 msecs+ 33.33 msecs+6.67 msecs).

Images a, b, c, d, e . . . imaged when monitoring, after being subjected to each of the above-described processings by the digital signal processor 16, are sent to the LCD 21 sequentially and displayed in the LCD 21. Hereby, the digital signal processor 16, during the time in which the image b . . . in continuation of the image a is transferred to the LCD 21, as illustrated in FIG. 4F, controls the double buffer memory of the video encoder so that the same image a is continuously displayed in the LCD 21.

Figure 6:
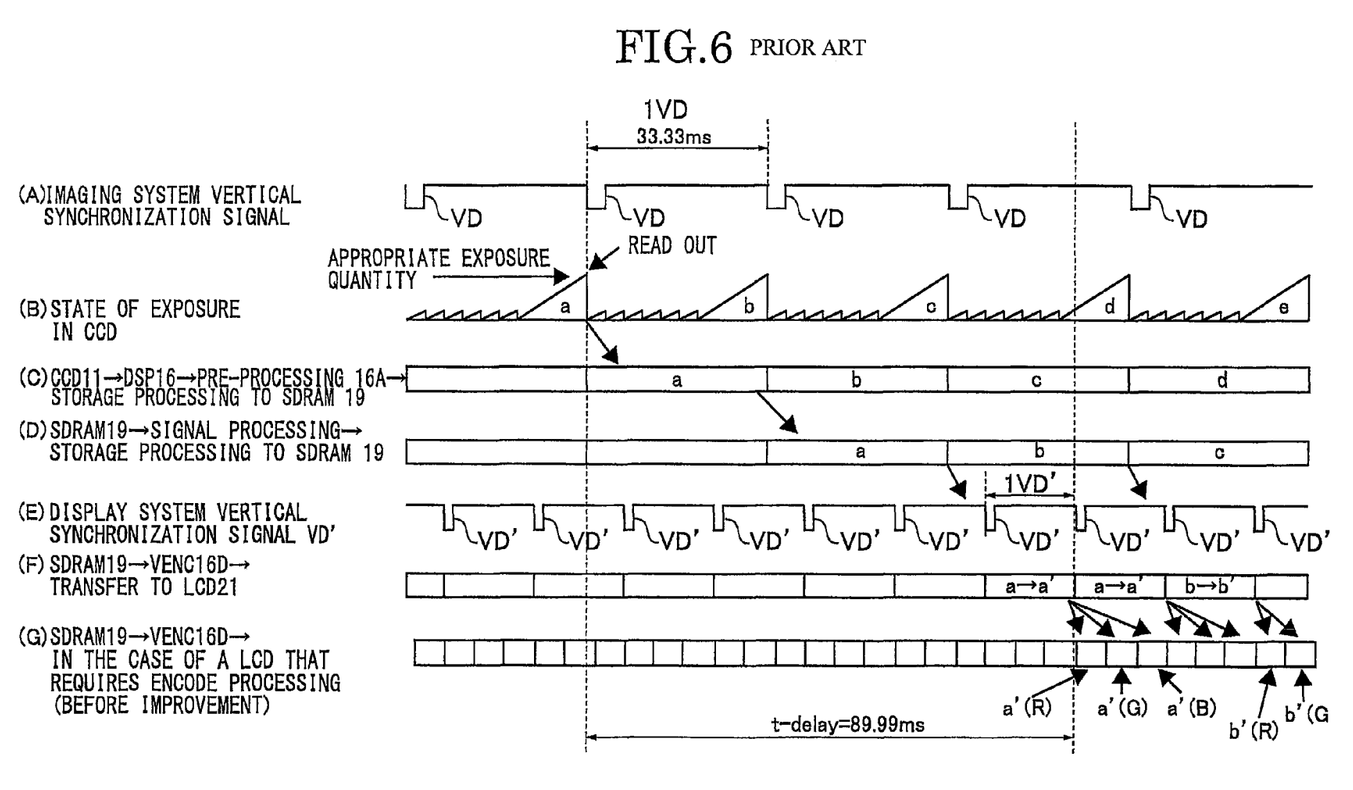
FIG. 6 is a timing chart describing the problematic points of a monitoring operation of an EVF of a conventional digital still camera.

FIG. 6 illustrates a timing chart of the digital still camera in order to show the problems generated when the switch-over switch 22 is manipulated so that image data is displayed in the EVF 2 from a state where the image is displayed in the LCD 21 and monitoring of a photogenic subject is being performed.

Hereby, in the same way as the LCD 21, the EVF 2 is inputted with 8 bit RGB image data. In addition, the EVF 2 stores once a one screen portion of the 8 bit RGB image data in an internal circuit thereof. Furthermore, the EVF 2 of a type that lights up the LCD 3 based on RGB surface sequence data is adopted.

The processing from FIG. 6A to FIG. 6E is the same as the processing from FIG. 4A to FIG. 4E. The LCD 3 with a small display area but requires resolution is used for the EVF 2. The LCD 3 utilizes the survival attribute of the human eye, and adopts a format to secure the area per pixel while improving the appearance resolution by lighting up one pixel using RGB surface sequence data.

Therefore, the EVF 2 requires time for encoding the inputted 8 bit RGB image data to RGB surface sequence data. As illustrated in FIG. 6F, the period of time of the one vertical synchronization signal (1 VD') of the display system is required for this time. As a result, the screen display in the EVF 2 is further delayed by 16.66 msecs against the delay time illustrated in FIG. 4.

Therefore, as illustrated in FIG. 6A, paying attention to image a, the time delay t_delay from the read out of image data from the CCD 11 to when image data is displayed in the display surface of the LCD 3 of the EVF 2 is 89.99 msecs. In addition, in FIG. 6F, signs (a→a') and (b→b') designate the conversion from 8 bit RGB image data to surface sequence image data, in FIG. 6G, a' (R), a' (G), a' (B), b' (R), b' (G) illustrate the image display by the surface sequence image data.

When the EVF 2 is used as a substitution for an optical finder, there is a sense of discomfort when t_delay is longer than the LCD 21, and it is difficult to time photographing correctly. In addition, in the EVF 2, the LCD 3 is disposed within the cover member 5. Image observation is performed by looking into the cover member 5 so that a thin smear sometimes generated when framing a high brightness photogenic subject, which essentially was not a problem outdoors because visibility was not good, becomes noticeable. In addition, in the EVF 2, the LCD 3 as a comparatively small display device is gazed at so that a general smear generated in the case a point light source of a spot light or the like enters a frame becomes noticeable.

On the other hand, the EVF 2 has a small image display area and external light is shielded so that power consumption required for display is less than for the LCD 21. Because power consumption between the EVF 2 and the LCD 21 differs greatly, the discharge properties of a battery change.

Therefore, it is necessary to store a plurality of battery check tables in the ROM 18, which causes an increase in capacity of the ROM 18.

Figure 7:
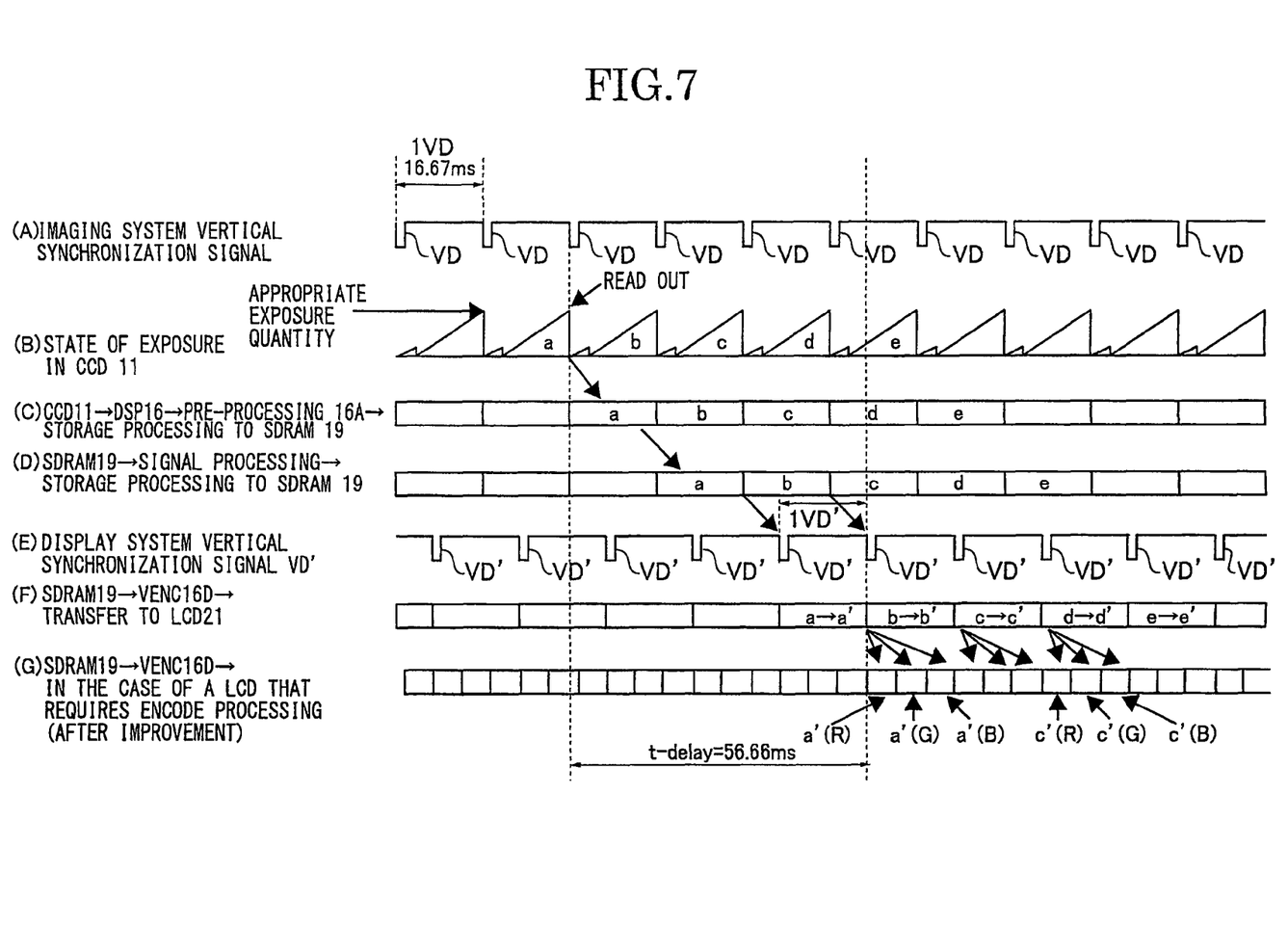
FIG. 7 is a timing chart describing a monitoring operation of an EVF of a digital still camera according to an embodiment of the present invention.

Thereby, in an embodiment of the present invention, against the drive frequency of a horizontal synchronization signal of the imaging system set to 9.2 MHz when the LCD 21 is driven as illustrated in FIG. 4A, the drive frequency of a horizontal synchronization signal of the imaging system is set to 18.4 MHz when the EVF 2 is driven as illustrated in FIG. 7A. When the horizontal drive frequency of the imaging system is set to 18.4 MHz, the state of exposure of the CCD 11 is as illustrated in FIG. 7B. In addition, a storage processing from the CCD 11 to the SDRAM 19 is illustrated in FIG. 7C, 7D, and the time required for display processing is illustrated in FIG. 7F. In such a way, the drive frequency of a horizontal synchronization signal of the imaging system when the EVF 2 is driven is set to two times the 9.2 MHz drive frequency of a horizontal synchronization signal of the imaging system when the LCD 21 is driven, with the horizontal drive frequency of the display system remaining still, and the time delay t_delay from when image data is read out from the CCD 11 until image data is displayed in the display surface of the LCD 3 of the EVF 2 can be shortened to 56.66 msecs.

When the horizontal drive frequency of the EVF 2 is set high, display delay can be further improved against display delay generated in the case using the LCD 21, and in principle, it becomes closer to the state of display of an optical finder system that does not generate any time delay.

Figure 8:
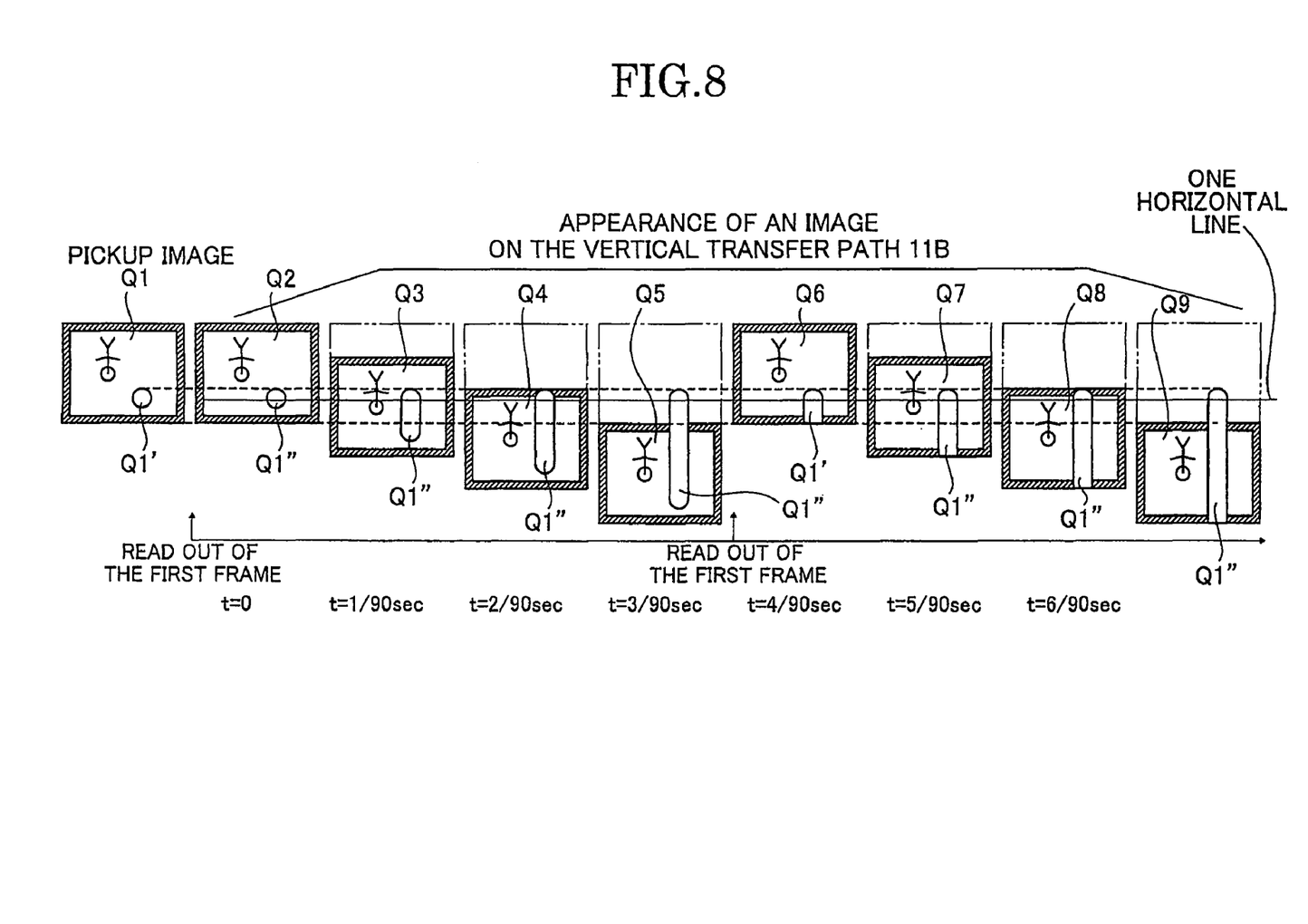
FIG. 8 is a schematic diagram describing the generation of smears.

Next, the state of the smear generated within an imaged image is described referring to FIG. 8.

In FIG. 8, sign Q1 illustrates a photogenic subject image (photographing image) photographed by the CCD 11. The photogenic subject image Q1 on the CCD 11 is in a state in which head and tail are upside down. A high brightness photogenic subject image Q1' exists within the photogenic subject image Q1. In addition, in FIG. 8, the shaded areas are optical black areas OB in which a pixel part (photo diode) 11A is covered by an aluminum vapor-deposited film.

The pixel part 11A is covered by an aluminum vapor-deposited film so that light does not enter. In general, electrical charge signals are not outputted from the pixel part 11A covered with the optical black area OB, and electrical charge signals output from the pixel part 11A covered with the optical black area OB are close to zero.

The transfer state of a photogenic subject image of the photogenic subject image Q1 on the vertical transfer part 11B is illustrated by signs Q2~Q9 in FIG. 8. Signs Q2 through sign Q9 illustrate the state of image transfer per ninetieth of a second, and vertical transfer of an image of one frame is implemented per thirtieth of a second.

The time when image transfer to the vertical transfer part 11B begins from a state in which smearing is not generated is set as t=t0, vertical transfer of electrical charge signals of a portion of one horizontal line is performed, by the vertical transfer, and electrical charge signals of the most bottom step (most leftward in FIG. 5) including the pixel part 11A covered by the optical black area OB are sent to a horizontal transfer part 11C.

Electrical charge signals sent to the horizontal transfer part 11C are sequentially sent to an amplifier (not illustrated), and afterwards are sent to the correlated double sampling and the analog digital converter circuit 12. The transfer operation is performed repeatedly for only a portion of the number of steps of the vertical transfer part 11B so that electrical charge signals of one screen portion are read out.

Until electrical charge signals of one horizontal line portion are read out, time needed to horizontally transfer the horizontal pixel number×a portion of one pixel is required. In the meantime, a smear component is generated based on a high brightness photogenic subject.

As a result, after a ninetieth of a second, as illustrated by sign Q1", the so-called smear is generated lengthening and dragging on a trail on the reverse side to the vertical transfer of a high brightness photogenic subject.

After a thirtieth of a second, read out of one screen is completed. Then read out of an image of the next one frame begins, but because the smear component remains in the vertical transfer part 11B, electrical charge signals based on the smear Q1" lengthening in a direction from the high brightness photogenic subject towards the vertical transfer part 11B are added to electrical charge signals based on the next image.

In such a way, with the high brightness photogenic subject image Q1' as the center, the smear Q1" lengthening in a direction orthogonal to the lengthening direction of the vertical transfer part is generated. The smear Q1" is also generated in the pixel part 11A existing in the optical black area OB whose general output should be 0.

The smear detection part 16G determines whether a smear is present or not by judging whether the electrical charge signals of the pixel part 11A existing in the optical black area OB are above or below a predetermined threshold value.

To determine whether the electrical charge signals of the pixel part 11A existing in the optical black area OB are possibly caused by a smear or by dark electrical charges, electrical charge signals at a plurality of points of the pixel part 11A existing in the optical black area OB are compared In such a way, the smear detection part 16G determines whether a smear is present or not by judging whether the electrical charge signals of the pixel part 11A existing in the optical black area OB are above or below a predetermined threshold value.

The digital signal processor 16, based on the detection result by the smear detection part 16G, when a smear is not detected, maintains the clock signal frequency when an image is to be displayed on the EVF 2 to the clock signal frequency of 9.2 MHz when an image is displayed on the LCD 21.

In such a way, an increase in power consumption can be prevented. As a result, as many photographed images as possible can be obtained.

In addition, a function as a photogenic subject movement detection part that detects the relative movement of the photogenic subject can be included in the digital signal processor 16. The relative movement of a photogenic subject can be achieved by utilizing an image processing technology that calculates the movement vector of the whole screen (for example, refer to JP2003-78807A).

By the relative movement detection processing of the photogenic subject, the relative movement of a digital still camera against a photogenic subject, for example, movement due to camera shake and relative movement of a photogenic subject against a digital still camera in a static state can be detected. Based on the detection results of a gyro sensor 23, when the photogenic subject is determined as having no relative movement against an imaging apparatus, the clock signal frequency when an image is to be displayed on the EVF 2 is maintained at the clock signal frequency of 9.2 MHz when an image is displayed on the LCD 21. In such a way, an increase in power consumption can be prevented. As a result, as many photographed images as possible can be obtained.

In addition, when an image is displayed on the EVF 2, a processing to increase a clock signal frequency by the digital signal processor 16 can be implemented by a first stage release manipulation of a photographing switch of a user interface I/F 17.

With such a constitution, the clock signal frequency can be increased just before the implementation of photographing by a user, follow-up properties can be improved and as a result, increases in power consumption can be prevented even if only slightly, and consequently, many photographed images can be obtained.

Furthermore, when the operation speed of an image pickup device 11 is set corresponding to the switch-over of an output device from the LCD 21 to the EVF 2, the increased portion of power consumption can be approximately the same as the decreased portion of power consumption decreasing corresponding to the switch-over of an output device from the LCD 21 to the EVF 2.

With such a constitution, power consumption consumed corresponding to the switch-over of image display parts can be maintained to approximately the same as before a switch-over state and an effect that can evaluate the remaining quantity of voltage of a battery using one battery check voltage can be obtained.

ADVANTAGEOUS EFFECT OF THE INVENTION

An imaging apparatus according to the present invention includes one image display part configured to display using one display format a processed image, another image display part configured to display using another display format a processed image and requiring more processing time than the time required for display processing by the one display format. An operation speed of an image pickup device drive part is fastened corresponding to the switch-over of an image display device from the one image display part to the another image display part. When a smear is not detected, it is not necessary in the first place to set the operation speed in order to restrain the generation of a smear, and the operation speed when an image is displayed in the another image display part is maintained at the operation speed when an image is displayed in the one image display part so that an increase in power consumption can be prevented. As a result, as many photographed images as possible can be obtained.

When an imaging apparatus according to the present invention detects no relative movement of a photogenic subject, for example, when the imaging apparatus is in a static state and does not detect the state of movement by a photogenic subject against the imaging apparatus, it is not necessary to consider in the first place the follow-up properties of a photogenic subject image against the movement of the photogenic subject. The operation speed when an image is displayed in the another image display part is maintained at the operation speed when an image is displayed in the one image display part so that an increase in power consumption can be prevented. As a result, as many photographed images as possible can be obtained.

Because an imaging apparatus according to the present invention implements a processing that sets an operation speed based on a first stage release manipulation of a photographing switch, the operation speed is set just before the implementation of photographing by a user so that follow-up properties can be improved, and as a result, an increase in power consumption can be prevented even if only slightly, and consequently, many photographed images can be obtained.

In an imaging apparatus according to the present invention, an increased portion of power consumption consumed when an operation speed of an image pickup device is set corresponding to the switch-over of the image display devices from the one image display part to the another image display part is approximately the same as a decreased portion of power consumption decreasing in correspondence to the switch-over of output devices from the one image display part to the another image display part. Therefore, power consumption in correspondence to the switch-over of image display parts is maintained at approximately the same level as before the switch over state so that an effect that evaluates the remaining quantity of a battery using one battery check voltage can be obtained.

INDUSTRIAL APPLICABILITY

An imaging apparatus according to the present invention switches-over image display devices from the one image display part to the other image display part, by setting the operation speed of the image pickup device drive part corresponding to the switch over and maintaining the operation speed at the operation speed by the one image display part when a smear is not detected or when the movement of a photogenic subject is not detected. Therefore, it is useful as an imaging apparatus that can maintain the quantity of power consumption and obtain as many photographed images as possible.

Although the preferred embodiments of the present invention have been described, it should be understood that the present invention is not limited to these embodiments, and various modifications and changes can be made to the embodiments.

The invention claimed is:

1. An imaging apparatus, comprising:
   an image pickup device that images a photogenic subject;
   a drive part that drives the image pickup device in order to read out image signals from the image pickup device;
   a digital signal processing part in which image signals outputted from the image pickup device are inputted and processed;
   one image display part connected to the digital signal processing part and configured to display using one display format a processed image;
   another image display part connected to the digital signal processing part and configured to display using another display format the processed image and which requires more time for display processing than the time required for display processing by the one display format; and
   an image switch-over part for switching over an image display device between the one image display part and the another image display part;
   wherein the digital signal processing part includes an operation speed shift part for fastening the speed of operation of the drive part in correspondence to the switch-over of an image display device from the one image display part to the another image display part; and
   a smear detection part for detecting smears based on image data obtained from the image pickup device,
   wherein when smears are not detected based on the detection result of the smear detection part, the digital signal processing part maintains the speed of operation at the time an image is displayed in the another image display part to the speed of operation at the time an image is displayed in the one image display part.

2. An imaging apparatus, comprising:
   an image pickup device that images a photogenic subject;
   a drive part that drives the image pickup device in order to read out image signals from the image pickup device;
   a digital signal processing part in which image signals outputted from the image pickup device are inputted and processed;

one image display part connected to the digital signal processing part and configured to display using one display format a processed image;
another image display part connected to the digital signal processing part and configured to display using another display format the processed image and which requires more time for display processing than the time required for display processing by the one display format;
an image switch-over part for switching over an image display device between the one image display part and the another image display part; and
a photogenic subject movement detection part that detects a relative movement of the photogenic subject,
wherein the digital signal processing part includes an operation speed shift part for fastening the speed of operation of the drive part in correspondence to the switch-over of an image display device from the one image display part to the another image display part; and
wherein when the photogenic subject movement detection part detects no movement of the photogenic subject, the digital signal processing part maintains the speed of operation at the time an image is displayed in the another image display part to the speed of operation at the time an image is displayed in the one image display part.

3. An imaging apparatus, comprising:
an image pickup device that images a photogenic subject;
a drive part that drives the image pickup device in order to read out image signals from the image pickup device;
a digital signal processing part in which image signals outputted from the image pickup device are inputted and processed;
one image display part connected to the digital signal processing part and configured to display using one display format a processed image;
another image display part connected to the digital signal processing part and configured to display using another display format the processed image and which requires more time for display processing than the time required for display processing by the one display format; and
an image switch-over part for switching over an image display device between the one image display part and the another image display part;
wherein the digital signal processing part includes an operation speed shift part for fastening the speed of operation of the drive part in correspondence to the switch-over of an image display device from the one image display part to the another image display part; and
wherein the digital signal processing part instructs the operation speed shift part to implement a processing of increasing a clock signal frequency based on a first stage release manipulation of a photographing switch.

4. An imaging apparatus according to claim 1, wherein the power consumption required for display processing by the another image display part is less than the power consumption required for display processing by the one image display part.

5. An imaging apparatus according to claim 2, wherein the power consumption required for display processing by the another image display part is less than the power consumption required for display processing by the one image display part.

6. An imaging apparatus according to claim 3, wherein the power consumption required for display processing by the another image display part is less than the power consumption required for display processing by the one image display part.

7. An imaging apparatus according to claim 1, wherein the display area of the another image display part is smaller than the display area of the one image display part.

8. An imaging apparatus according to claim 2, wherein the display area of the another image display part is smaller than the display area of the one image display part.

9. An imaging apparatus according to claim 3, wherein the display area of the another image display part is smaller than the display area of the one image display part.

10. An imaging apparatus according to claim 1, wherein the one image display part is a liquid crystal display device, and the another image display part is an electrical viewfinder device,
wherein the electrical viewfinder device includes a display device, a magnifying optical system that magnifies an image displayed in the display device and a cover member that covers the display device and the magnifying optical system and is configured to shield light.

11. An imaging apparatus according to claim 2, wherein the one image display part is a liquid crystal display device, and the another image display part is an electrical viewfinder device,
wherein the electrical viewfinder device includes a display device, a magnifying optical system that magnifies an image displayed in the display device and a cover member that covers the display device and the magnifying optical system and is configured to shield light.

12. An imaging apparatus according to claim 1, wherein the digital signal processing part instructs the operation speed shift part to implement a processing of fastening an operation speed based on a first stage release manipulation of a photographing switch.

13. An imaging apparatus according to claim 2, wherein the digital signal processing part instructs the operation speed shift part to implement a processing of fastening an operation speed based on a first stage release manipulation of a photographing switch.

14. An imaging apparatus according to claim 1, wherein a horizontal drive frequency of the image pickup device when the image is displayed in the another image display part is two times the horizontal drive frequency when the image is displayed in the one image display part.

15. An imaging apparatus according to claim 1, wherein an increase in power consumption consumed when an operation speed of the image pickup device is fastened in correspondence to the switch-over of display devices of an image from the one image display part to the another image display part is the same as a decrease of power consumption in correspondence to the switch-over of display devices of an image from the one image display part to the another image display part.

* * * * *